US010191714B2

(12) United States Patent
Wiggemans et al.

(10) Patent No.: US 10,191,714 B2
(45) Date of Patent: Jan. 29, 2019

(54) GAMING PERIPHERAL WITH BUILT-IN AUDIO SUPPORT

(71) Applicant: Performance Designed Products LLC, Burbank, CA (US)

(72) Inventors: Yannik Wiggemans, Studio City, CA (US); Brad Strahle, Crestline, CA (US); Antonio Meneses, Chula Vista, CA (US); Frank Van Brussel, San Diego, CA (US); Abid Mozaffar, San Diego, CA (US); Rene Trenado, San Ysidro, CA (US)

(73) Assignee: Performance Designed Products LLC, Burbank, CA (US)

( * ) Notice: Subject to any disclaimer, the term of this patent is extended or adjusted under 35 U.S.C. 154(b) by 0 days.

(21) Appl. No.: 15/984,851

(22) Filed: May 21, 2018

(65) Prior Publication Data

US 2018/0267771 A1    Sep. 20, 2018

Related U.S. Application Data (63) Continuation of application No. 15/607,332, filed on May 26, 2017, now abandoned, which is a
(Continued)

(51) Int. Cl.
*G06F 3/02* (2006.01)
*G06F 3/16* (2006.01)
(Continued)

(52) U.S. Cl.
CPC .......... *G06F 3/162* (2013.01); *A63F 13/2145* (2014.09); *A63F 13/22* (2014.09);
(Continued)

(58) Field of Classification Search
None
See application file for complete search history.

(56) References Cited

U.S. PATENT DOCUMENTS

| 8,556,721 B2 | 10/2013 | Aronzon |
| 9,504,910 B2 | 11/2016 | Aronzon |

(Continued)

FOREIGN PATENT DOCUMENTS

| WO | WO 2014/187923 A1 | 11/2014 |
| WO | WO 2016/176003 A1 | 11/2016 |

OTHER PUBLICATIONS

International Search Report and Written Opinion received for International Patent Application No. PCT/US2017/013550, Applicant: Performance Designed Products LLC, dated Apr. 28, 2017, 10 pages.

*Primary Examiner* — Ronald Laneau
(74) *Attorney, Agent, or Firm* — Knobbe, Martens, Olson & Bear LLP (57) ABSTRACT

Various embodiments described herein are directed toward gaming peripherals with built-in audio support. The gaming peripheral may include a plurality of input mechanisms configured to control a video game. The video game may be controlled via the plurality of input mechanisms in a first mode. Handheld input devices applicable to some embodiments may include, without limitation, computer controllers, video game console controllers, and handheld video gaming devices. Input mechanisms applicable to various embodiments may include, for example, control sticks (e.g., joysticks or analog sticks operable by a user's finger, such as a thumbstick), buttons, switches, and directional pads. The gaming peripheral may include a designated input mechanism that, when engaged, reconfigures the gaming peripheral into a second mode causing at least one of the plurality
(Continued)

of input mechanisms, when actuated, to adjust audio attributes of the video game without interrupting play of the video game.

20 Claims, 4 Drawing Sheets

Related U.S. Application Data continuation of application No. 14/995,554, filed on Jan. 14, 2016, now abandoned.

(51) Int. Cl.
*A63F 13/22* (2014.01)
*A63F 13/2145* (2014.01)
*A63F 13/23* (2014.01)
*A63F 13/235* (2014.01)
*A63F 13/87* (2014.01)

(52) U.S. Cl.
CPC ............ *A63F 13/23* (2014.09); *A63F 13/235* (2014.09); *A63F 13/87* (2014.09); *G06F 3/02* (2013.01)

(56) References Cited

U.S. PATENT DOCUMENTS

| | | |
|---|---|---|
| 2005/0169252 A1 | 8/2005 | Riggs |
| 2006/0205507 A1 | 9/2006 | Ho |
| 2006/0239471 A1 | 10/2006 | Mao |
| 2007/0218966 A1 | 9/2007 | Tilston |
| 2009/0304205 A1 | 12/2009 | Hardacker |
| 2010/0048301 A1 | 2/2010 | Miller, IV |
| 2010/0267454 A1 | 10/2010 | Navid |
| 2011/0021269 A1 | 1/2011 | Woff-Peterson |
| 2011/0130203 A1 | 6/2011 | Reiss |
| 2011/0250963 A1 | 10/2011 | Bauer |
| 2014/0139629 A1* | 5/2014 | Baiyya ............... A63F 13/06 382/103 |
| 2014/0143451 A1* | 5/2014 | Baiyya ............... A63F 13/06 710/9 |
| 2014/0221097 A1* | 8/2014 | Plagge ............... A63F 13/06 463/36 |
| 2014/0364221 A1 | 12/2014 | Imai |
| 2016/0351362 A1* | 12/2016 | Tsai ................... H01H 21/22 |

\* cited by examiner

GAMING PERIPHERAL WITH BUILT-IN AUDIO SUPPORT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entirety and should be considered a part of this specification.

BACKGROUND

Field

The present invention relates to input devices and, more particularly, some embodiments relate to input devices having built-in audio support.

Description of the Related Art

The use of specially configured and customized human input devices, such as video game controllers, keyboards, mice, and trackpads, have a history of use in controlling various devices in many industries. Generally, human input devices (hereafter, simply referred to as "input devices") are configured or customized to meet the needs or preferences of an individual user, often with respect to particular context, application or environment of use. Input devices typically include one or more input mechanisms adapted to receive an input (e.g., physical input) from a user and to translate the input into a corresponding output that may be electrical or mechanical in nature. For instance, an electronic input device, such as a digital handheld controller that is coupled to a processor-based system may receive a physical input from a user (e.g., via an input mechanism) and translate the physical input into a corresponding electrical signal readable by the digital input device.

In the realm of video game consoles (e.g., handheld or other video game consoles) and other video game processor-based systems (e.g., PDAs, laptops, smartphones, etc.), specially configured or customized input devices may include handheld game controllers (e.g., motion-enabled and otherwise), joysticks, analog sticks, digital sticks, directional pads, steering wheels, musical instrument controllers, pads (e.g., dance pads), and the like. Typically, the special configuration of input devices include user preferences relating to ergonomics of the input device, aesthetics of the input device, assignment of buttons or input mechanisms, and the specific application (e.g., first-person shooter video game) with which the input device is being used. Input devices have not been available with built-in audio support. That is, a gamer must pause, enter a display menu, or otherwise interrupt play of the video game to adjust audio attributes of the video game or other accessories associated with the video game or gaming console.

SUMMARY

Various embodiments of the invention(s) described herein are directed toward input devices, and more specifically, toward input devices with built-in audio control capabilities. Input devices applicable to some embodiments may include, without limitation, computer controllers, video game console controllers, and handheld video gaming devices (e.g., handheld video game consoles, or video game-enabled mobile devices). According to various embodiments, an input device, such a gaming peripheral (e.g., a gaming controller) may include at least one of a gamepad, a joystick, a paddle, a trackball, a throttle quadrant, and a steering wheel. The gaming peripheral may be provided having built-in audio support via input mechanisms included within the gaming peripheral and may be communicatively coupled to a game console over a wired or wireless communication interface.

According to one embodiment, the gaming peripheral may include a body, a plurality of input mechanisms, and a designated input mechanism. Depending on the embodiment of the gaming peripheral, the plurality of the input mechanisms and the designated input mechanism may take various forms including, for example, control sticks (e.g., joysticks, digital sticks, or analog sticks such as thumbsticks, which are operable by a user's finger), buttons, switches, directional pads (or D-Pads), sensors, levers, and touchpads. For some embodiments, a button may be an electronic button, a mechanical button, a trigger, a shoulder button, or a bumper button; a switch may be a rocker switch, a flip switch, or a slide switch; and a directional pad may be a round directional pad or a plus-shaped directional pad. Additionally, the input mechanisms may be digital or analog in nature, and may vary in size, appearance, contour, and material based on the embodiment.

In some embodiments, the input mechanisms may be configured to control a video game while the gaming peripheral is in a first mode. The first mode may be a mode in which the input mechanisms (e.g., directional pad, buttons, etc.) may control various characters or objects of the video game. The first mode may be similar to that of a standard gaming peripheral. The designated input mechanism, when engaged, may reconfigure the gaming peripheral into a second mode causing at least one of the input mechanisms, when actuated, to adjust audio attributes of the video game without interrupting play of the video game. Interrupting play of the video game may include pausing the video game, accessing a display menu of the video game, and/or selecting or adjusting audio attributes through the display menu of the video game. In this manner, gaming peripheral allows for audio attribute adjustment directly from gaming peripheral without pausing the video game, having to wait for the session of the video game to end, or otherwise interrupting play of the video game.

In some embodiments, a video game may include a chat functionality. The chat functionality may allow gamers in remote locations to communicate with one another. A gamer may use a headset or speaker to listen to audible information from other gamers and/or audible information associated with the video game (e.g., music, sounds associated with various objects during play of the video game, etc.). The headset may include a microphone to receive audible information. Alternatively, the microphone may be standalone, such that the microphone is not attached to a headset. In some embodiments, the headset may be communicatively coupled to the gaming peripheral over a wired or wireless communication interface. The chat functionality may be used by gamers of the same or different sessions of the video game to talk with one another, help one another find objects, or simply communicate about other topics with one another.

According to some embodiments, the audio attributes may include at least one of a volume attribute associated with the video game, a volume attribute associated with the chat, a game-chat balance attribute, a mute attribute associated with the chat, and a mute attribute associated with the video game. The volume attribute associated with the video game may include at least one of a volume level of background music associated with the video game, a volume level associated with one or more objects of the video game, a volume level associated with one or more actions of the video game, a volume level associated with a display menu of the video game, and other volume levels associated with the video game, during play or set up. The volume attribute associated with the chat may include a volume level associated with communication of other gamers. The game-chat balance attribute may include the volume level associated with the video game relative to the volume level associated with communication of other gamers. The mute attribute associated with the chat may include muting the microphone such that other gamers may not hear communication of the gamer and unmuting the microphone such that other gamers may hear communication of the gamer. The mute attribute associated with the video game may include muting the headset and/or speakers such that the gamer may not hear the audio attributes associated with communication of other games and/or audio attributes associated with the video game and unmuting the headset and/or speakers such that the gamer may hear the audio attributes associated with communication of other games and/or audio attributes associated with the video game.

In some embodiments, the gaming peripheral may include a light source. The light source may be configured to indicate a current state of the mute attribute. The light source may include a light-emitting diode.

In certain embodiments, when the gaming peripheral is in the second mode, some input mechanisms that were previously used to control objects of the video game in the first mode of the gaming peripheral may be used to adjust audio attributes of the video game. If some input mechanisms of the gaming peripheral are not configured to adjust the audio attributes of the video game in the second mode of the gaming peripheral, then those input mechanisms may continue to control objects of the video game while the gaming peripheral is configured to be in the second mode.

In some embodiments, the gaming peripheral may return to the first mode when the designated input mechanism is actuated again. The plurality of input mechanisms, when actuated, may continue controlling objects of the video game.

In various embodiments, the gaming peripheral may adjust an illumination of the gaming peripheral or a rumble intensity associated with the gaming peripheral directly through the gaming peripheral. In some embodiments, profiles associated with different users of the gaming peripheral may be stored such that a gamer may quickly access the gamer's preferences for input mechanism configurations, as input mechanism configurations for gaming peripherals may vary. A user may also store various profiles with different preferences for the gaming peripheral such that the gamer may access and/or toggle through different profiles in the second mode of gaming peripheral without interrupting play of the video game.

Other features and aspects of the systems, methods and apparatuses described herein will become apparent from the following detailed description, taken in conjunction with the accompanying drawings, which illustrate, by way of example, features in accordance with various embodiments. The summary is not intended to limit the scope of the invention(s), which is defined solely by the claims attached hereto.

BRIEF DESCRIPTION OF THE DRAWINGS

One or more various embodiments described herein are done so in detail with reference to the following figures. The drawings are provided for purposes of illustration only and merely depict typical or embodiments. These drawings are provided to facilitate the reader's understanding of various embodiments and shall not be considered limiting of the breadth, scope, or applicability of embodiments. It should be noted that for clarity and ease of illustration these drawings are not necessarily made to scale.

Some of the figures included herein illustrate various embodiments of the invention(s) from different viewing angles. Although the accompanying descriptive text may refer to such views as "top," "bottom" or "side" views, such references are merely descriptive and do not imply or require that the invention(s) be implemented or used in a particular spatial orientation unless explicitly stated otherwise.

The figures are not intended to be exhaustive or to limit various embodiments to the precise form disclosed. It should be understood that various embodiments may be practiced with modification and alteration, and that embodiments may be limited only by the claims and the equivalents thereof.

DETAILED DESCRIPTION

The present disclosure is directed toward a gaming peripheral with built-in audio control capabilities. Particularly, one or more embodiments are directed toward providing a designated input mechanism (e.g., a button, lever, trigger, actuator, etc.) on the gaming peripheral, which, when actuated, may reconfigure the gaming peripheral to cause at least one of the other input mechanisms (e.g., a button, lever, trigger, actuator, etc.) included within the gaming peripheral to operate to adjust audio attributes of a video game or chat associated with the video game without pausing or otherwise interrupting play of the video game. That is, various audio attributes associated with the video game, the gaming console, and accessories associated with the video game or gaming console (e.g., a headset, a microphone, etc.) may be adjusted on the fly directly through the gaming peripheral without pausing the video game or entering a display menu within the video game. When the designated input mechanism is actuated, the gaming peripheral may be reconfigured into a second mode, where a first mode of the gaming peripheral is a mode in which the input mechanisms control objects of the video game (e.g., characters, cars, objects, etc.). One or more input mechanisms, when actuated in the second mode of the gaming peripheral, may adjust various audio attributes, as discussed in further detail below, quickly. The gaming peripheral may then return to the first mode when the designated input mechanism is once again actuated by the gamer. The actuation and re-actuation of the designated input mechanism may be accomplished, for example, by engaging a button to enter one mode and releasing the button to enter the other mode, by configuring a switch in a first position to enter one mode and a second position to enter the other mode, by pressing a button to toggle between modes, pressing one button to enter one mode and another button to enter the other mode, and so on.

Figure 1:
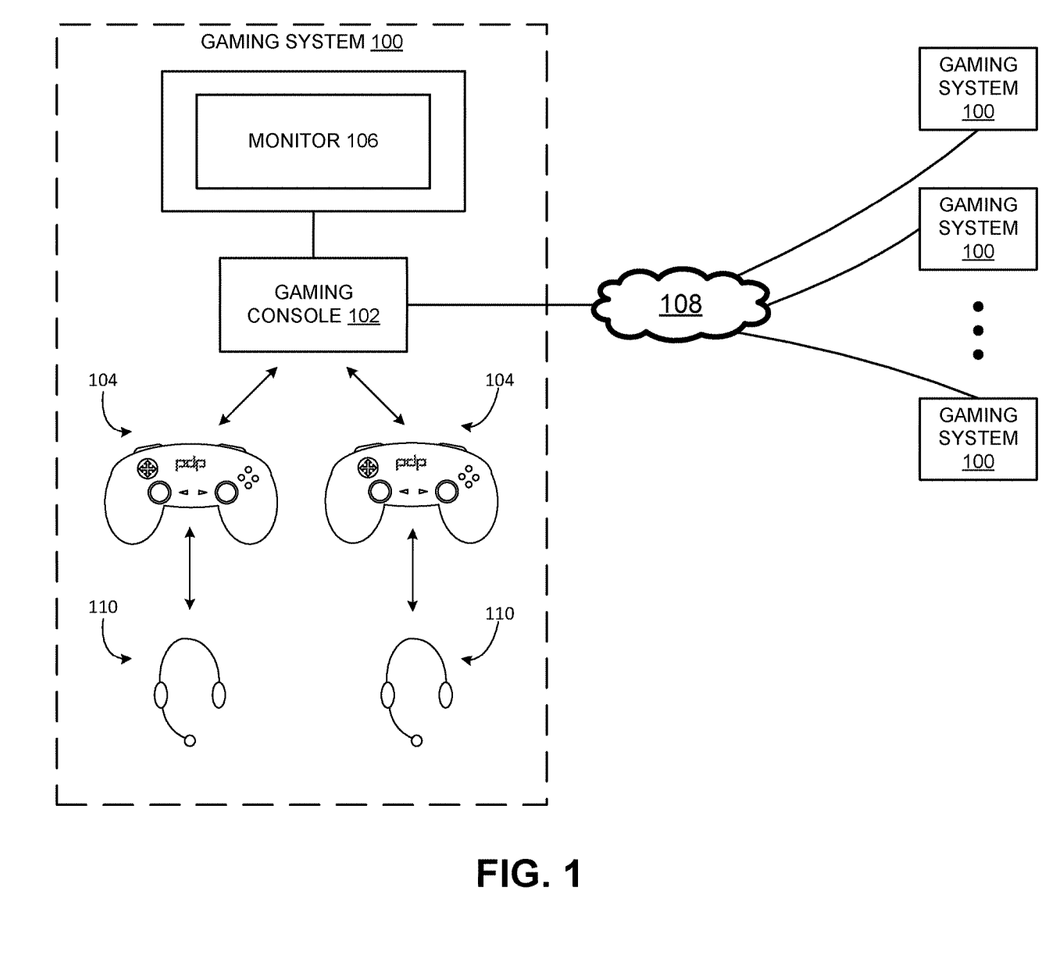
FIG. 1 is a block diagram illustrating a generalized version of a gaming system as one example of an environment with which various embodiments may be implemented.

Before describing the invention in detail it is useful to describe a few example environments with which the invention may be implemented. One such example is that of a gaming system used by one or more video game players, or gamers, to play computer games or video games. FIG. 1 is a block diagram illustrating a generalized version of gaming system 100 as one example of an environment with which the invention may be implemented. Referring now to FIG. 1, the example gaming system includes gaming console 102, a monitor 106, and gaming controllers 104 (e.g., a gaming peripheral). The illustrated example also includes an interface to a communication medium or communication network 108 such as, for example, the internet or other communication channel.

In one environment, gaming console 102 might be implemented as a PlayStation®, Xbox®, Wii™ or other like gaming console. In another implementation, gaming console 102 may be implemented as a personal computer or other like computing device. Gaming console 102 may include a processor or other computing device providing the ability to allow gaming applications, including software applications, to be run thereon. A gaming application may be installed, for example, through the use of CD ROM drives, DVD drives, or other storage medium or communications interfaces. Typically, gaming console 102 may be analogized to a computer or computing system to run the gaming software. In another environment, gaming console 102 may be implemented as a personal computer.

Monitor 106 may be provided to allow the gaming environment to display to the gamer during play of the video game. Monitor 106 may also be used to display menus and other features to the gamer to enhance the game play environment. Various interfaces may be provided between gaming console 102 and monitor 106 to provide the proper video signal to drive monitor 106. For example, RGB, NTSC, VGA, and other signal types or specifications may be used to provide communications between gaming console 102 and monitor 106. Audible information may include a chat between gamers in remote locations, music and sounds associated with the video game, etc.

Although not illustrated, speakers may also be provided with monitor 106 to provide audible information to the gamer during play of the video game and during set up. For example, in one embodiment, monitor 106 might be implemented as a television with built in speakers that may be connected to gaming console 102 via a coaxial or other audio and video input.

Headset 110 may be provided separate from monitor 106 to provide audible information to the gamer during game play and during set up. Headset 110 may also provide a microphone to receive audible information from the gamer to contribute to a chat feature of the video game during game play and during set up. The microphone may be a separate component from headset 110. The interface between headset 110 with gaming controllers 104 and/or gaming console 102 may be wired and/or wireless interfaces as desired. Likewise, throughout this document, references to communication or signal interfaces may be implemented using wired or wireless interfaces, unless otherwise specified.

Also illustrated in the example environment are gaming controllers 104 that may be used to allow gamers to provide input to the game software as well as to receive feedback from the game software during set up and game play. Controllers 104 may include, for example, X, Y, A, B buttons, trigger buttons, analog joysticks, key pads, and other devices to allow the user to provide input to the video game. Thus by actuating the various buttons, switches or joysticks, the gamer may control the operation of the video game or control characters or vehicles within the video game. The interface between controllers 104 and gaming console 102 may be either wired and/or wireless interfaces as may be desired. Likewise, throughout this document, references to communication or signal interfaces may be implemented using wired or wireless interfaces, unless otherwise specified.

Also illustrated in the example of FIG. 1 is a communications connection to network 108. For example, a user may wish to connect gaming console 102 to the internet or other communication medium whereby game information may be downloaded or uploaded to various websites, on line services such as Xbox Live™, or other entities or services. Also, through communication medium 108, gamers might compete amongst other gamers at their gaming systems 100, even if such other gamers are located at remote or distant locations. Note that depending on the gaming environment, remote gaming systems 100 may or may not have similar configurations to one another.

Although not depicted, gaming system 100 may have feedback devices, or stimulus, that may be used to provide sensory feedback from gaming console 102 to the gamer. Gaming system 100 may also have biosensors allowing for bio-information (e.g., biometrics) regarding the gamer to provide to gaming console 102. Both the biosensors and feedback devices may communicate to gaming console 102 via a separate communication path from controllers 104. For example, feedback devices may communicate through the USB ports or like communication ports as those found on gaming consoles 102 such as the XBOX 360®, PlayStation®, and personal computing systems. Biosensors and feedback devices may also be configured to connect through ports of handheld gaming consoles 102, often referred to as expansion ports. As a further example, biosensors and feedback devices may communicate with gaming consoles 102 via wireless communication interfaces.

In yet another embodiment, feedback devices and biosensors may communicate with gaming console 102 via a communication path through gaming controller 104. For example, the communication controller may be equipped with another communication interface and the biosensors, feedback devices, or both may be communicatively coupled (whether hard wired or wirelessly) to gaming controller 104. As one specific example of this case, a biosensor and feedback device may be configured for communicative coupling to a Wii® controller via the Wii controller's Wii Nunchuck® pass-through port. As these examples illustrate, there are a number of mechanisms by which a biosensor or feedback device may be interfaced to gaming controller 104 or to gaming console 102.

It should be understood by those of ordinary skill in the art that environments described above allow the various features and embodiments of the invention to be portrayed in the context of an exemplary application. After reading this description, it will become apparent to one of ordinary skill in the art how embodiments of the invention may be implemented in different alternative environments.

Figure 2:
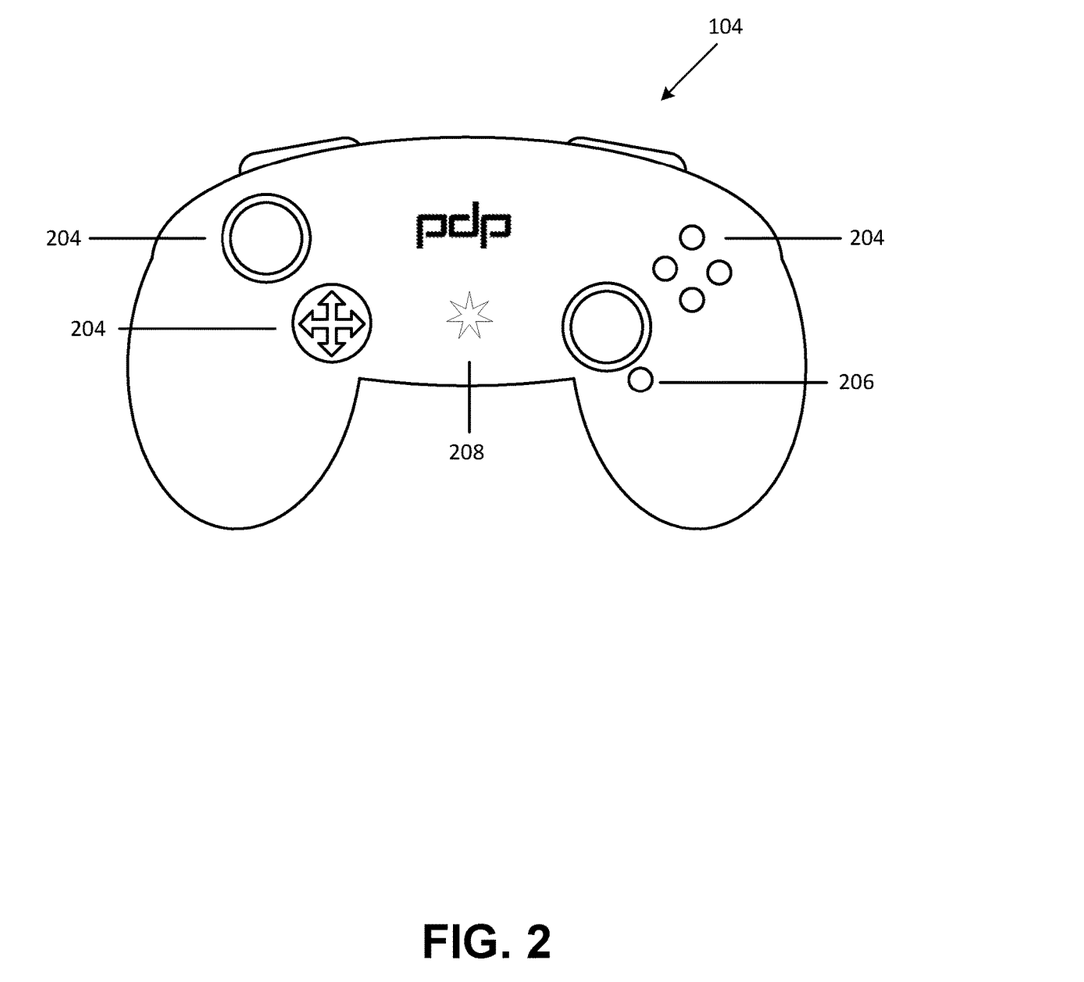
FIG. 2 depicts an example video game controller comprising a plurality of input mechanisms and a designated input mechanism in accordance with various embodiments.

FIG. 2 illustrates an example gaming controller 104 (e.g., a gaming peripheral) in accordance with one embodiment of the present invention. Referring now to FIG. 2, gaming controller 104 is provided depicting body 202, plurality of input mechanisms 204, designated input mechanism 206, and light source 208. As discussed with reference to FIG. 1, gaming controller 104 may communicatively couple to gaming console 102 over a wired or wireless communication interface. Gaming controller 104 may include at least one of a gamepad, a joystick, a paddle, a trackball, a throttle quadrant, and a steering wheel. A gamepad may include a gaming peripheral which is held by both hands of the gamer with thumbs and fingers used to provide input to gaming console 102. A joystick may include a gaming peripheral with a handheld stick which may move in different directions to provide input to gaming console 102. A paddle may include a gaming peripheral that includes a round wheel and one or more buttons used to provide input to gaming console 102. A trackball may include a gaming peripheral which may be manipulated by a gamer's palm of his or her hand to provide input to gaming console 102. A throttle quadrant may include a gaming peripheral that includes one or more levers used to provide input to gaming console 102, such that the one or more levers may simulate controls of a vehicle or aircraft of the video game. A steering wheel may include a gaming peripheral that includes a wheel to provide input to gaming console 102, such that the wheel may control a vehicle of the video game.

The plurality of input mechanisms 204 may be configured to control the video game. The video game may be controlled via input mechanisms 204 in a first mode. The first mode of gaming controller 104 may include a mode in which gaming controller 104 is automatically configured during set up of the video game. For example, in the first mode of gaming controller 104, input mechanisms 204 may be used to control various objects of the video game. Objects of the video game may include a character, a vehicle, and/or any other object of the video game capable of being controlled by the gamer via gaming controller 104. Input mechanisms 204 may include at least one of a button, a switch, an analog stick, a digital stick, a directional pad, a lever, a sensor, and a touchpad.

Designated input mechanism 206 may be included as one of plurality of input mechanisms 204. As such, designated input mechanism 206 may include at least one of a button, a switch, an analog stick, a digital stick, a directional pad, a lever, a sensor, and a touchpad. When engaged (e.g., when the gamer has pressed, selected, actuated, or triggered designated input mechanism 206), designated input mechanism 206 may cause gaming controller 104 to reconfigure into a second mode causing at least one input mechanism 204, when actuated (e.g., when the gamer has pressed, selected, engaged, or triggered at least one input mechanism 204), to adjust audio attributes of the video game without interrupting play of the video game. Interrupting play of the video game may include pausing the video game, entering a display menu of the video game (displayed via monitor 106 of FIG. 1), and manually adjusting audio attributes through the display menu of the video game, thus disrupting play of the video game.

Video games may often include a chat functionality such that gamers participating in the same or different sessions of a video game may communicate with one another during play of the video game. The gamer may use headset 110 or speakers to listen to audible information (e.g., communication) of other gamers. Headset 110 may include a microphone to receive audible information from the gamer (e.g., the gamer may speak into the microphone) to communicate to other gamers. Alternatively, the microphone may be standalone, such that the microphone is not attached to headset 110 and/or speakers. The chat functionality may be used by gamers of the same or different sessions of the video game to talk with one another, help one another find objects, or simply communicate about other topics with one another.

The audio attributes may include at least one of a volume attribute associated with the video game, a volume attribute associated with the chat, a game-chat balance attribute, a mute attribute associated with the chat, and a mute attribute associated with the video game, and so on. The volume attribute associated with the video game may include, for example, at least one of a volume level of background music associated with the video game, a volume level associated with one or more objects of the video game, a volume level associated with one or more actions of the video game, a volume level associated with a display menu of the video game, and other volume levels associated with the video game, during play or set up. The volume attribute associated with the chat may include, for example, a volume level associated with communication of other gamers. The game-chat balance attribute may include the volume level associated with the video game relative to the volume level associated with communication of other gamers. The mute attribute associated with the chat may include muting the microphone such that other gamers may not hear communication of the gamer and unmuting the microphone such that other gamers may hear communication of the gamer. The mute attribute associated with the video game may include muting headset 110 and/or speakers such that the gamer does not hear the audio attributes associated with communication of other games and/or audio attributes associated with the video game and unmuting headset 110 and/or speakers such that the gamer may hear the audio attributes associated with communication of other games and/or audio attributes associated with the video game.

Adjusting the audio attributes may include causing the video game to alter the audio attributes of the video game. As discussed above, audio attributes of the video game may include, for example, volume levels associated with different objects, actions, or music of the video game, either during play of the video game or set up. For example and referring to FIG. 3, designated input mechanism 206 is shown along with input mechanism 204 (e.g., a directional pad). If, during play of the video game, the gamer wishes to increase or decrease the volume level associated with the music of the video game, designated input mechanism 206 may be actuated by the gamer, causing gaming controller 104 to reconfigure to a second mode such that input mechanism 204 may be used to adjust the volume of the music of the video game. The gamer may actuate the directional pad by pressing up, down, left, or right to increase or decrease the volume level of the music of the video game. In the second mode, one or more input mechanisms 204 may no longer control objects of the video game (as input mechanisms 204 normally would in the first mode of gaming controller 104), but rather may be used to adjust various audio attributes of the video game directly through gaming controller 104 without having to pause the video game, enter a display menu of the video game, or select the volume level through the display menu of the video game. The gamer may simply select designated input mechanism 206 to quickly adjust the audio attributes via input mechanism 204 by actuating the directional pad (or any other input mechanism 204 that may be used to adjust audio attributes) up, down, left, or right while the video game continues uninterrupted. If some input mechanisms 204 are not configured to adjust audio attributes in the second mode of gaming controller 104, then those input mechanisms 204 may continue to control objects of the video game in the second mode. The gamer may return to the first mode by again actuating designated input mechanism 206 to cause gaming controller 104 to reconfigure to the first mode, in which input mechanism 204, when actuated, may control an object of the video game once again. Those skilled in the art will appreciate that other configurations to adjust the audio attributes of the video game may be possible using gaming controller 104 without interrupting play of the video game. For example, other input mechanisms 204 (e.g., A, B, X, Y buttons) may be used to adjust the audio attributes of the video game in the second mode.

Figure 3:
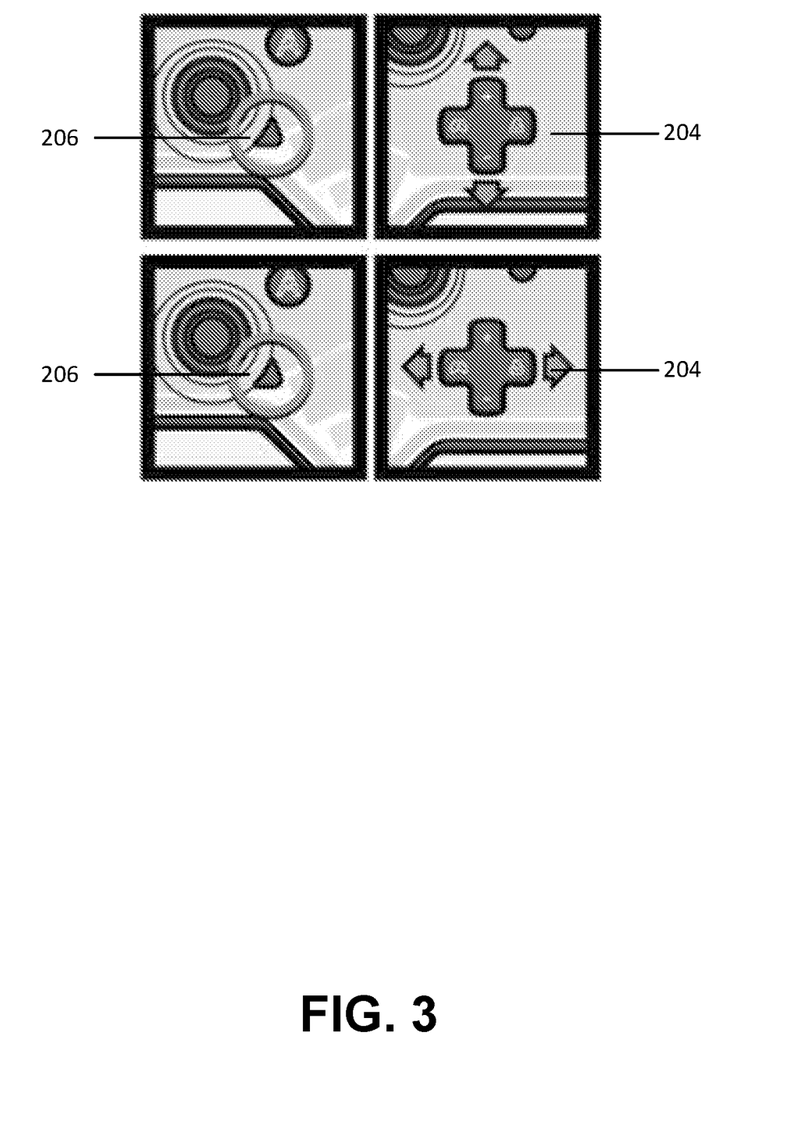
FIG. 3 depicts an example input mechanism and a designated input mechanism in accordance with various embodiments.

Adjusting the audio attributes may include causing headset 110 to alter the audio attributes of headset 110. As discussed above, audio attributes of headset 110 may include the volume level associated with communication of other game players, the volume level associated with different objects, actions, or music of the video game, the game-chat balance attribute, the mute attribute associated with the chat (e.g., defining whether other gamers may hear communication of the gamer using gaming controller 104), and the mute attribute associated with the video game (e.g., defining whether headset 110 and/or speaker is muted such that the gamer may not hear music and/or other audible information associated with play of the video game). For example, if, during play of the video game, the gamer wishes to increase or decrease the volume level associated with communication of other gamers during the chat of the video game, designated input mechanism 206 may be actuated by the gamer, causing gaming controller 104 to reconfigure to the second mode such that an input mechanism 204 may be used to adjust the volume level of the chat of the video game.

For example, where the directional pad is used to adjust chat volume, the gamer may actuate the directional pad by pressing up, down, left, or right to increase or decrease the volume level of the chat of the video game. In the second mode, one or more input mechanisms 204 may no longer control objects of the video game (as input mechanisms 204 normally would in the first mode of gaming controller 104), but rather may be used to adjust various audio attributes of the video game and/or headset 110 directly through gaming controller 104. In various embodiments, the second mode may be entered without having to pause the video game, enter the display menu of the video game, or select the volume level through the display menu of the video game. The gamer may simply actuate designated input mechanism 206 to quickly adjust the audio attributes via input mechanism 204 by actuating the appropriate input mechanism (e.g. by actuating directional pad up, down, left, or right) while the video game continues uninterrupted. This can allow, for example, real-time audio attribute adjustments on the fly which can provide a more pleasant gaming experience.

In in various embodiments not all input mechanisms 204 are mapped to adjust audio attributes in the second mode. In implementations where one or more input mechanisms 204 are not configured to adjust audio attributes in the second mode of gaming controller 104, then those input mechanisms 204 may continue to control objects of the video game in the second mode.

The gamer may return to the first mode by again actuating designated input mechanism 206 to cause gaming controller 104 to reconfigure to the first mode, in which input mechanism 204, when actuated, controls an object of the video game once again. Those skilled in the art will appreciate that other configurations to adjust the audio attributes of headset 110 may be possible using gaming controller 104 without interrupting play of the video game. For example, other input mechanisms 204 (e.g., A, B, X, Y buttons) may be used to adjust the audio attributes of headset 110 in the second mode.

In another example, the gamer may wish to adjust the game-chat balance attribute during play of the video game. That is, the gamer may wish to increase the volume level of the video game while decreasing the volume level associated with communication of other gamers at the same time, or vice versa. Designated input mechanism 206 may be actuated by the gamer, causing gaming controller 104 to reconfigure to the second mode such that input mechanism 204 may be used to adjust the game-chat balance attribute. The gamer may actuate the input mechanism 204 associated with game-chat balance (e.g., moving a joystick up, down, left, or right) to increase or decrease the volume level of the chat of the video game and decrease the volume level of the video game with a single push of a button (e.g., both the volume level of the chat and the volume level of the video game may be adjusted by simply actuating the directional pad up, down, left, or right).

In the second mode, one or more input mechanisms 204 may no longer control objects of the video game (as input mechanisms 204 normally would in the first mode of gaming controller 104), but rather may be used to adjust various audio attributes of the video game and/or headset 110 directly through gaming controller 104 without having to pause the video game, enter the display menu of the video game, or select the volume level through the display menu of the video game. The gamer may simply actuate designated input mechanism 206 to quickly adjust the audio attributes via the appropriate input mechanism 204 (e.g., by actuating the directional pad up, down, left, or right, by moving the joystick, by actuating the ABXY buttons, and so on, while the video game continues uninterrupted. If some input mechanisms 204 are not configured to adjust audio attributes in the second mode of gaming controller 104, then those input mechanisms 204 may continue to control objects of the video game in the second mode. The gamer may return to the first mode by again actuating designated input mechanism 206 to cause gaming controller 104 to reconfigure to the first mode, in which input mechanism 204, when actuated, may control an object of the video game once again. Those skilled in the art will appreciate that other configurations to adjust the game-chat balance attribute may be possible using gaming controller 104 without interrupting play of the video game. For example, other input mechanisms 204 (e.g., A, B, X, Y buttons) may be used to adjust the game-chat balance attribute in the second mode.

In an embodiment, the gamer may wish to mute or unmute a microphone such that the other gamers may not hear noise or communication by the gamer using gaming controller 104. In a similar manner as discussed above, designated input mechanism 206 may be actuated by the gamer, causing gaming controller 104 to reconfigure to the second mode such that input mechanism 204 may be used to mute or unmute microphone without interrupting play of the video game. In another embodiment, the gamer may double-tap designated input mechanism 206 to mute or unmute the microphone quickly. Those skilled in the art will appreciate that other configurations to mute or unmute the microphone may be possible using gaming controller 104 without interrupting play of the video game. The gamer may mute or unmute headset 110 and/or speaker in a similar manner, such that the gamer may not hear audible information associated with the chat and/or the video game via headset 110 or speaker.

Figure 4:
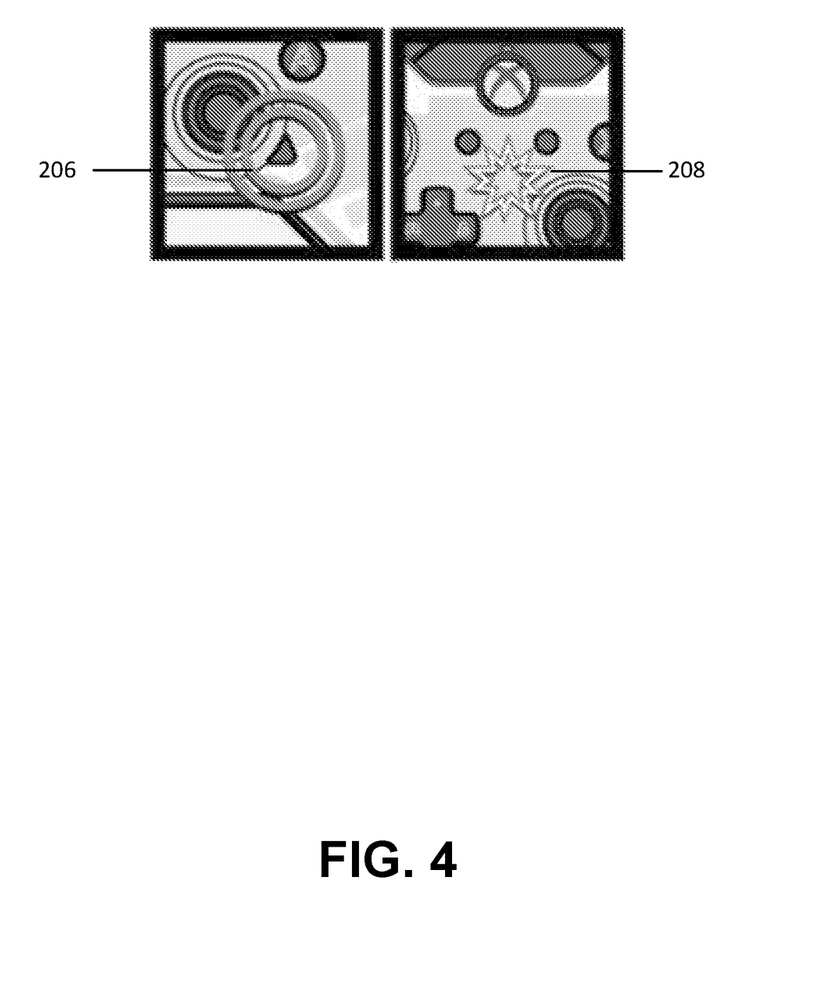
FIG. 4 depicts an example designated input mechanism and a light source in accordance with various embodiments.

As shown in FIG. 4, gaming controller 104 may include light source 208. Although illustrated as a single light source, light source 208 may include multiple light sources in each source may include a single color or a multicolor light source to provide visual information to the user regarding the audio attributes. For example, light source 208 can provide visual cues regarding the mode of the controller (whether in audio adjustment mode, or gaming mode), the volume levels of one or more attributes, the state of one or more mute functions (muted or unmuted), and so on.

For example, light source 208 may be configured to indicate a current state of the mute attribute associated with the chat (e.g., whether the microphone is muted or unmuted). For example, if the microphone is muted, light source 208 may be illuminated. If the microphone is unmuted, light source 208 may not be illuminated. Those skilled in the art will appreciate that other configurations of light source 208 may be possible, such that light source 208 may be illuminated if the microphone is unmuted, while light source 208 may not be illuminated if the microphone is muted.

As another example, light source 208 may also be configured to indicate a current state of the mute attribute associated with the video game (e.g., whether headset 110 or speaker is muted or unmuted). As a further example, a second light source (not shown) may be provided on gaming controller 104 to indicate the current state of the mute attribute associated with the video game along with the first light source showing the current state of the mute attribute for the microphone.

The light source may include one or more light-emitting diodes (LEDs), but those skilled in the art will appreciate that other light sources or visual indicators may be used. For example, conventional bulbs, halogen bulbs, or other light sources may be used in place of LEDs. The light source may be configured as one or more individual LEDs, bar displays, multicolor displays, and so on. In yet further embodiments, the light source may be a display screen such as, for example, an LCD, LED or OLEO display to provide visual information to the user about the state of the audio attributes and the mode of the controller.

While audio attributes have been discussed herein, those skilled in the art will appreciate that other attributes associated with gaming controller 104, gaming console 102, or the video game may be adjusted via gaming controller 104 without interrupting play of the video game. For example, gaming controller 104 may include a plurality of other light sources to illuminate the gaming controller 104 for aesthetic purposes or to provide other lighting effects. For example, a light ring may be provided about the periphery of the controller, or around the input mechanisms, and so on. As another example, the body or portions thereof may be made of transparent or semitransparent materials, or of light diffuser materials, to allow the body or portions of the body to light up or glow.

In various embodiments, the intensity, color, or other attributes of these ascetic light sources may be adjusted by input mechanisms in the second mode (or in some embodiments, and a third mode) of gaming controller 104. For example, the gamer may wish to change an illuminated color of gaming controller 104 from green to red. Designated input mechanism 206 may be actuated by the gamer, causing gaming controller 104 to reconfigure to the second mode such that a designated input mechanism 204 may be actuated to adjust the illuminated color of gaming controller 104. For example, the gamer may actuate the directional pad by pressing up, down, left, or right to change the illuminated color of gaming controller 104 without interruption of play of the video game. The gamer may simply select designated input mechanism 206 to quickly adjust the illuminated color of gaming controller 104 via input mechanism 204 by actuating the directional pad up, down, left, or right while the video game continues uninterrupted. The gamer may return to the first mode by again actuating designated input mechanism 206 to cause gaming controller 104 to reconfigure to the first mode, in which input mechanism 204, when actuated, may control an object of the video game once again. Those skilled in the art will appreciate that other configurations to adjust the illuminated color of gaming controller 104 may be possible using gaming controller 104 without interrupting play of the video game. For example, other input mechanisms 204 (e.g., A, B, X, Y buttons) may be used to adjust the illuminated color of gaming controller 104 in the second mode.

In the above described example, adjustment of lighting attributes is accomplished in the second mode, and accordingly, in various embodiments input mechanisms 204 may be designated as controlling audio attributes and lighting attributes. In another embodiment, a separate mode may be identified for controlling lighting attributes. This mode may be accessed, for example, using the same actuator 2062 toggle through the various modes, or by a separate actuator used to enter the lighting mode.

In another embodiment, gaming controller 104 may include a tactile feedback gaming peripheral. The tactile feedback gaming peripheral may generate a "rumble" in response to various actions during play of the video game. An intensity of the rumble of the tactile feedback gaming peripheral may be adjusted in an alternate mode of the tactile feedback gaming peripheral in a similar manner as discussed above, such that the gamer may adjust the intensity of the rumble to a higher intensity or a lower intensity, for example, without interrupting play of the video game (e.g. without exiting or pausing the video game).

While designated input mechanism 206 has been discussed herein as including at least one of a button, switch, analog stick, digital stick, directional pad, lever, sensor, or touchpad, those skilled in the art will appreciate that other configurations for designated input mechanism 206 may be utilized for gaming controller 104. For example, gaming controller 104 may include an actuator within the handheld device such that the gamer may squeeze or tap the handheld device with the gamer's hand or finger to activate reconfiguration of gaming controller to the second mode and/or to return to the first mode.

Gaming controller 104, gaming console 102, and/or the video game may include a plurality of profiles associated with different gamers. Different gamers may have different preferences for input mechanism configurations (e.g., which input mechanisms adjust which audio attributes, etc.), illuminations, rumble intensity, etc. Gaming controller 104, gaming console 102, and/or the video game may store the different preferences for different gamers such that the profile may be selected during play of the video game or during set up. Further, each gamer may have different preferences for input mechanisms, illuminations, rumble intensity, etc. stored for different video games. Profiles may be toggled or selected in a similar manner as discussed above, such that the gamer may activate the second mode of gaming controller 104 via designated input mechanism 206 and may select profiles with different stored preferences for various attributes without interrupting play of the video game. For example, profile A associated with the gamer may include a preferred game-chat balance and a muted microphone. Profile B associated with the gamer may include a preference for a higher volume level for striking an enemy during play of the video game and a lower volume level associated with an enemy striking the character which the gamer is controlling. The gamer may quickly and easily toggle between profile A and profile B in the second mode of gaming controller 104 without interrupting play of the video game, such that gaming controller 104 may automatically be reconfigured to the stored preferences of the profile once selected.

In various embodiments, individual input mechanisms may be designated to control or adjust particular audio attributes. For example, a directional pad might be designated as controlling chat volume, while a joystick control scheme volume and ABXY buttons control various muting functions. In embodiments where additional attributes may be controlled (e.g., one or more of audio attributes, lighting attributes, and tactile feedback attributes), the individual input mechanisms may likewise be designated to control or adjust particular ones of these attributes. In some embodiments, these designations of which input mechanism controls which attribute are preset by the manufacturer, while in other embodiments, these may be reconfigured such as, for example, through menu screen accessed by the console or via the game.

While various embodiments have been described above with respect to a handheld video gaming device, it should be understood that they have been presented by way of example only, and not of limitation. Those of ordinary skill in the art would appreciate that some embodiments may include other handheld control devices having input mechanisms, and may include handheld control devices used in non-gaming contexts/environments (e.g., control of unmanned aerial vehicles [UAVs], unmanned ground vehicles, or remote control [R/C] vehicles).

Likewise, the various diagrams may depict an example architectural or other configuration for the invention(s), which is done to aid in understanding the features and functionality that may be included in the invention(s). The invention(s) are not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention(s). In addition, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention(s) are described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention(s), whether or not such embodiments are described and whether or not such features are presented as being a part of a described embodiment. Thus, the breadth and scope of the present invention(s) should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

What is claimed is:

1. A handheld video game controller, comprising:
   a controller body comprising
      a pair of thumbsticks, a directional pad and a plurality of buttons, each operable in a first mode of operation by a user to control one or more objects of a video game,
      a designated input button actuatable by the user to reconfigure the directional pad into a second mode of operation so that operation of the directional pad adjusts one or more audio attributes of the video game, wherein while in the second mode, pressing the directional pad in one or more of an up, down, right and left directions adjusts a video game volume level, and wherein once in the second mode of operation, actuation of the designated input button by the user returns the directional pad to the first mode of operation where operation of the directional pad controls said one or more objects of the video game, and
      a light source operable to indicate whether a microphone of a headset in communication with the video game controller is muted or unmuted.

2. The video game controller of claim 1, wherein the light source is configured to illuminate when the microphone is muted.

3. The video game controller of claim 1, wherein the designated input button is a depressible button configured to be pressed by the user to reconfigure the directional pad into the second mode.

4. The video game controller of claim 1, wherein the video game controller communicates said one or more audio attributes with the headset.

5. The video game controller of claim 4, wherein the video game controller communicates wirelessly with the headset.

6. The video game controller of claim 1, wherein pressing the designated input button reconfigures the directional pad into the second mode of operation, and wherein once in the second mode of operation, releasing the designated input button returns the directional pad to the first mode of operation.

7. The video game controller of claim 1, wherein the designated input button is movably mounted on a housing of the controller body.

8. A handheld video game controller, comprising:
a controller body comprising
  a pair of thumbsticks, a directional pad and a plurality of buttons, each operable in a first mode of operation by a user to control one or more objects of a video game,
  a designated input button actuatable by the user to reconfigure the directional pad into a second mode of operation so that operation of the directional pad adjusts one or more audio attributes of the video game, wherein while in the second mode, pressing the directional pad in one or more of an up, down, right and left directions adjusts a voice chat audio volume level, and wherein once in the second mode, actuation of the designated input button by the user returns the directional pad to the first mode of operation where operation of the directional pad controls said one or more objects of the video game, and
  a light source operable to indicate whether a microphone of a headset in communication with the video game controller is muted or unmuted.

9. The video game controller of claim 8, wherein the light source is configured to illuminate when the microphone is muted.

10. The video game controller of claim 8, wherein the designated input button is a depressible button configured to be pressed by the user to reconfigure the directional pad into the second mode.

11. The video game controller of claim 8, wherein the video game controller communicates said one or more audio attributes with the headset.

12. The video game controller of claim 11, wherein the video game controller communicates wirelessly with the headset.

13. The video game controller of claim 8, wherein pressing the designated input button reconfigures the directional pad into the second mode of operation, and wherein once in the second mode of operation, releasing the designated input button returns the directional pad to the first mode of operation.

14. The video game controller of claim 8, wherein the designated input button is movably mounted on a housing of the controller body.

15. A handheld video game controller, comprising:
a controller body comprising
  a pair of thumbsticks, a directional pad and a plurality of buttons, each operable in a first mode of operation by a user to control one or more objects of a video game,
  a designated input button actuatable by the user to reconfigure the directional pad into a second mode of operation so that operation of the directional pad adjusts one or more audio attributes of the video game, wherein while in the second mode, pressing the directional pad in one or more of an up, down, right and left directions adjusts a balance between a video game volume level relative to a voice chat audio volume level, and wherein once in the second mode, actuation of the designated input button by the user returns the directional pad to the first mode of operation where operation of the directional pad controls said one or more objects of the video game, and
  a light source operable to indicate whether a microphone of a headset in communication with the video game controller is muted or unmuted.

16. The video game controller of claim 15, wherein the light source is configured to illuminate when the microphone is muted.

17. The video game controller of claim 15, wherein the designated input button is a depressible button configured to be pressed by the user to reconfigure the directional pad into the second mode.

18. The video game controller of claim 15, wherein the video game controller communicates said one or more audio attributes with the headset.

19. The video game controller of claim 18, wherein the video game controller communicates wirelessly with the headset.

20. The video game controller of claim 15, wherein pressing the designated input button reconfigures the directional pad into the second mode of operation, and wherein once in the second mode of operation, releasing the designated input button returns the directional pad to the first mode of operation.

* * * * *